March 6, 1951　　　　　C. STEIN　　　　　2,543,877
SPEED WARNING SIGNAL FOR AUTOMOBILE DRIVERS
Filed April 8, 1949　　　　　　　　　　　　　3 Sheets-Sheet 1
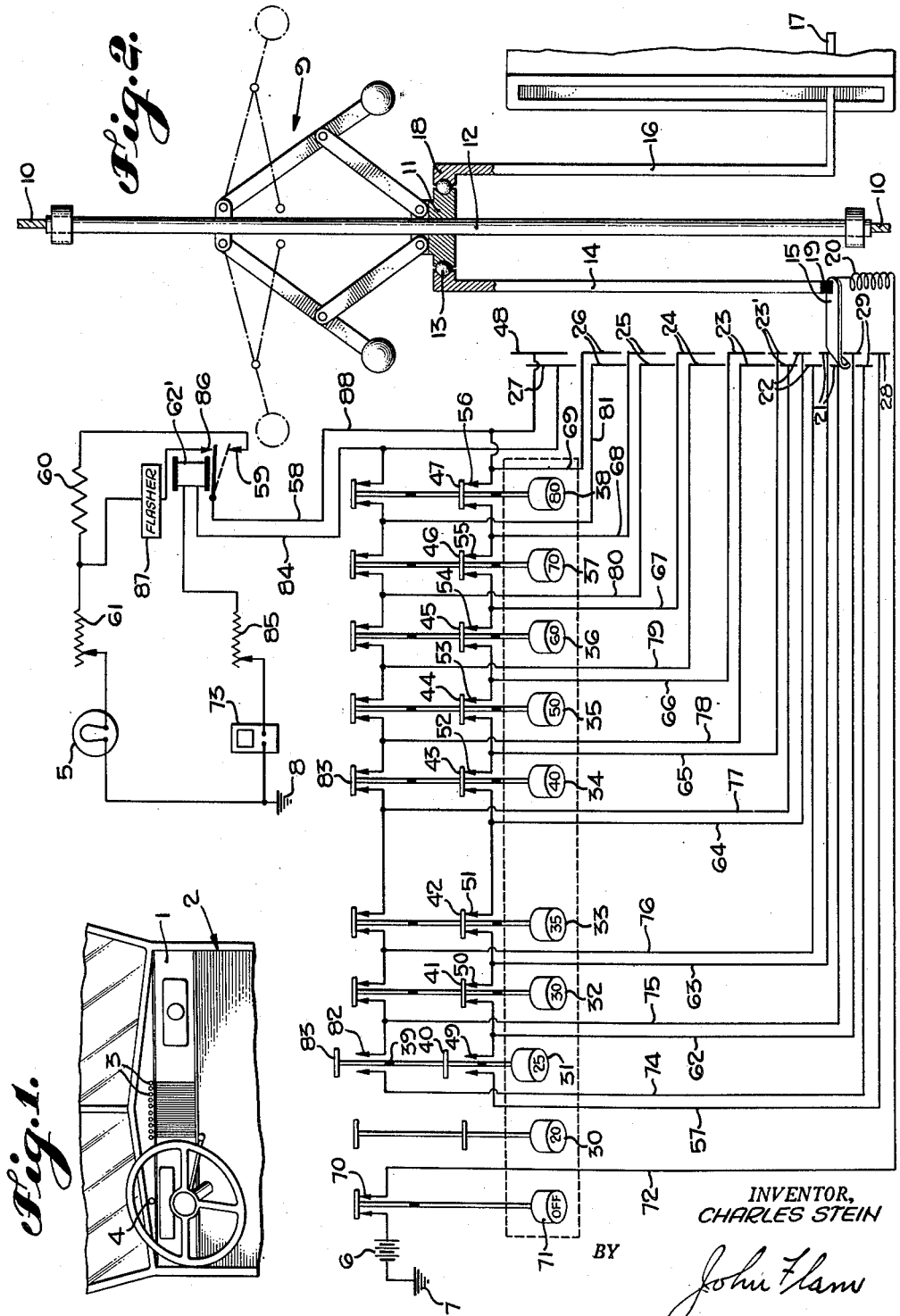
INVENTOR,
CHARLES STEIN
BY
John Flam
ATTORNEY

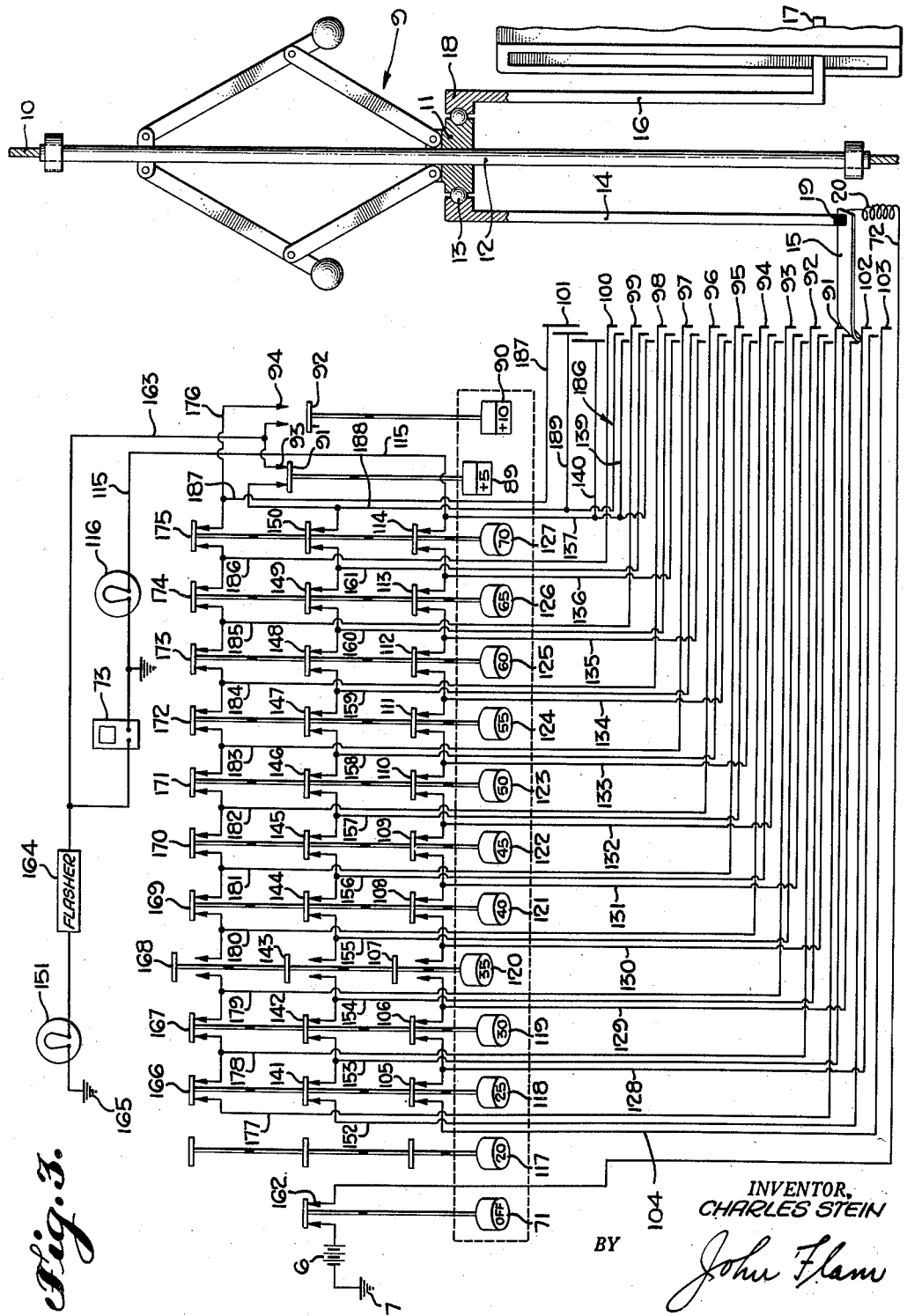

March 6, 1951          C. STEIN          2,543,877

SPEED WARNING SIGNAL FOR AUTOMOBILE DRIVERS

Filed April 8, 1949          3 Sheets—Sheet 3

INVENTOR,
CHARLES STEIN
BY
John Flam
ATTORNEY

Patented Mar. 6, 1951

2,543,877

UNITED STATES PATENT OFFICE 2,543,877

SPEED WARNING SIGNAL FOR AUTOMOBILE DRIVERS

Charles Stein, Los Angeles, Calif.

Application April 8, 1949, Serial No. 86,150

11 Claims. (Cl. 177—311.5)

This invention relates to a signaling system adapted to be used in an automotive vehicle, to apprise the operator when a desired speed is exceeded.

Although an operator may intend to obey legal speed limitations, it is not very easy for him to do so. He must be alert to read the posted limits; but this action on his part may be required quite often, as for example, in cities and towns where speed limits may change quite suddenly from street to street. And, in addition, he must also watch his speedometer. It is not uncommon, therefore, to find unintentional violations of the speed laws.

It is one of the objects of this invention to relieve the operator from the need of watching the speedometer.

It is another object of this invention to make it possible for the operator to set a signaling system (as by push buttons) so that a signal device is energized when a definite speed is exceeded, the selection of the speed being determined by selection of the appropriate control device (such as a push button) by the operator.

It is still another object of this invention to make it possible to provide a further distinct warning when the speed for which the first signal is set is exceeded by a definite amount.

When new cars are first operated, it is desirable to maintain the speed at a relatively low value. It is another object of this invention to make it possible to signal the operator when he approaches or arrives at the desired speed of operation.

It is another object of this invention to make it possible to maintain the driving range, such as for night driving, between relatively narrow limits, such as say above 60 and below 70 miles per hour, by appropriate signals set at these values.

It is still another object of this invention to provide a simple and inexpensive system of this general character.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Figure 1 is a pictorial view of a portion of an automobile, showing the dashboard with the signalling apparatus installed thereon;

Fig. 2 is a wiring diagram of one form of the invention; and

Figs. 3 and 4 are wiring diagrams of modified forms of the invention.

Figure 4:
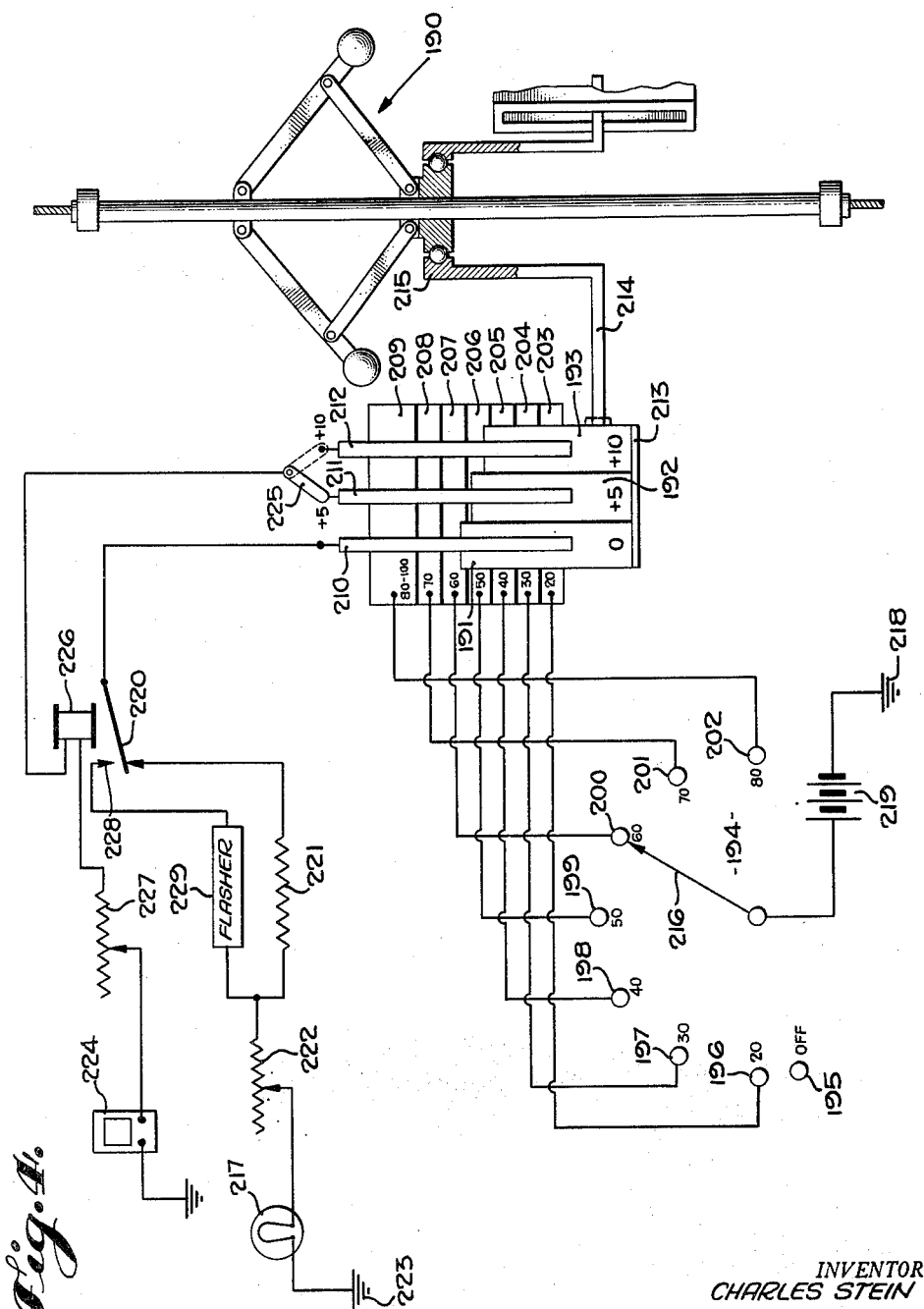

Fig. 1 illustrates a conventional dashboard 1 installed at the front of an automobile 2. In any convenient location on the dashboard are a number of push buttons 3. These may be arranged, for example, on the ledge leading to the front windshield of the automobile. One or more signaling devices, such as lamps or buzzers 4, are installed to be in plain view of the driver.

The push buttons 3 carry appropriate indicia corresponding to vehicle speeds, say, for example, from twenty to eighty miles per hour. These push buttons may be interlocked so that, when one is pressed in, all the others are released to return to a normal inactive position. When any push button is operated, one of the signaling devices 4 is energized when the speed corresponding to the button that has been operated is exceeded by the vehicle. The signaling device remains energized so long as the speed remains above the prescribed limit as predetermined by the particular button operated.

Optionally, another signaling device may be utilized to indicate when a further speed has been attained, as, for example, five miles or ten miles above the preset speed. For example, an additional audible signal may be provided; and the first signaling device, if it is a lamp, may be caused to flicker or flash.

By this means the operator can preset the system so that he will be warned upon the vehicle attaining a prescribed speed, and a further signal when the prescribed speed is exceeded by at least a definite amount.

One form of the system is illustrated diagrammatically in Fig. 2. In this instance, there is a visual signaling device 5, such as a lamp, that may be placed upon the dashboard. It may be energized from the automobile battery 6 through ground connections 7 and 8 by aid of a circuit to be hereinafter described.

A speed responsive mechanism 9 is provided which may operate upon the principle of a centrifugal governor. This device is shown diagrammatically, and includes in it a cable 10 that is a part of the usual speedometer system and has an angular velocity corresponding to the speed of the vehicle. A collar 11 is operated by device 9 to be vertically movable in accordance with the speed of the governor shaft 12. This collar 11 is connected in any appropriate manner, as by thrust bearings 13, to a non-rotary collar 18. A contact carrying arm 14 is supported upon collar 18. The contact or connector 15 is attached to the lower end of the arm 14, and is insulated therefrom by a block 19. A guiding arm 16 is provided with a horizontal extension 17 to guide the movement of the vertically moving mechanism associated with the speed responsive means 9.

The shaft 12 is insulated from the speedometer parts by insulation blocks 19. A flexible lead or pig-tail 20 is joined to the connection 15 and is long enough to permit connector 15 to move between its limits.

The contact member 15 is caused to assume a vertical position corresponding to the speed of the automobile, by the speed responsive means 9. The contact member 15 is wide enough to bridge pairs of contacts interposed in the path of movement of the contact 15.

Thus, for the position indicated in Fig. 2, a pair of stationary contacts 21, located at a height corresponding to a speed of thirty miles per hour are in current carrying relation to the contact 15. When that speed is attained, the contact 15 engages the lower edges of the stationary contacts 21. Above the contacts 21 are a similar pair of contacts 22 bridged by contact 15 at a speed of thirty-five miles per hours; then, above the contacts 22 are a set of contacts 23′ corresponding to forty miles per hour. Similar pairs of contacts 23, 24, 25, and 26 correspond in vertical spacing to a speed of fifty, sixty, seventy, and eighty miles per hour. Contacts 27 and 48 correspond to all speeds above eighty miles per hour. Similarly, a lower stationary contact member 28 is provided corresponding to twenty miles per hour; and above it are the contacts 29 to correspond to a speed of twenty-five miles per hour.

The sets of contacts 21 to 29, inclusive, are arranged in close vertical sequence. In this way, the contact member 15 is maintained in current carrying position at all times with at least one set of contacts.

Assuming that the signaling system has been preset, say, to cause energization of the signal lamp 5 when a speed of twenty-five miles per hour is reached, then, as soon as the contact member 15 reaches a vertical position corresponding to twenty-five miles per hour, contacts 29 are engaged and the signal lamp 5 is energized. It remains energized for all further upward movement of the contact member 15. On the other hand, the lamp 5 is de-energized just as soon as contact member 15 drops below the stationary contacts 29.

The control for this function is effected by the aid of a series of push buttons numbered 30 to 38, inclusive, controlling a series of circuit controllers. Each of these push buttons carries a numeral corresponding to the speed at which the signaling device is to be energized. Each of the buttons 31 to 38 carries a contact disc numbered 40 to 47, inclusive. Corresponding contacts 49 to 56, inclusive, are contacted by the discs 40 to 47, inclusive, when the corresponding push button is in its inactive position. Push buttton 31 is indicated as having been operated, and accordingly the contacts 49 are opened.

All of the contacts 49 to 56, inclusive, and the corresponding contact discs 40 to 47, form a series of circuit controllers that are in series in a circuit including the terminal conductors 57 and 58. Conductor 58 forms a part of a circuit that is capable of energizing the signaling device 5 through back contacts 59 of a relay 62; a fixed resistor 60, and an adjustable resistor 61.

The conductor 57 leads to the stationary contact 28 in the path of movement of the contact 15.

As heretofore stated, all of the push buttons 30 to 38 are so arranged that operation of one of them causes all of the other push buttons to return to the normal position, the corresponding circuit controllers for these other push buttons being closed. The button that is pressed, however, opens its corresponding circuit controller. Between the pairs of contacts 49 and 50 there is a connection 62 leading to one of the pairs of contacts 29. Similarly, connection 63 extends between adjacent circuit controllers 50 and 51 to one of the pair of contacts 21. Between each adjacent circuit controllers 51 to 56, there is a corresponding conductor 64, 65, 66, 67 or 68. These conductors are connected respectively to a contact of the pair of contacts 22, 23′, 23, 24 and 25. Similarly, one of the pair of contacts 26 is connected by conductor 69 directly to the terminal conductor 58.

Assuming that the twenty-five mile per hour button 31 is operated so as to open the contacts 49, any speeds less than twenty-five miles per hour will not cause energization of the signaling device 5, because an interruption in the energizing circuit is provided at open contacts 49. Thus, assuming that the automobile is traveling at a speed of only twenty miles per hour, the contact 28 is engaged by the movable contact 15. Under such circumstances, the circuit can be traced as follows: from ground 7, automobile battery 6, contacts 70 (closed by the "off" button mechanism 71), conductor 72, connection 20, contact member 15, contact 28, conductor 57, to the beginning of the series of controllers 49 to 56, thence through conductor 58, back contacts 59 of relay 62′, resistors 60 and 61, signaling device 5, to ground 8. Since the circuit is opened at contacts 49, the signaling device 5 is inactive.

However, just as soon as contact 15 makes connection with contacts 29, the circuit is completed through conductor 62 and through all of the closed circuit controllers 50 to 56, inclusive. Any further upward travel of the contact 15 still maintains the circuit closed for the signaling device 5. For example, when the contact 15 is connected to the contacts 21, the energizing circuit is completed through conductor 63, circuit controllers 51 to 56, inclusive, and thence through the remaining portions of the circuit, as heretofore described.

Now, if, instead of button 31, one of the subsequent buttons 32 to 38 be operated, it is clear that the signaling device 5 will not be energized until the contact 15 moves upwardly far enough to complete the circuit through that conductor 62 to 68, inclusive, which lies just beyond the open circuit controller.

Upon attainment of a speed of eighty miles per hour, the circuit is completed directly through conductors 69 and 58.

The "off" button 71, when actuated, serves to render the entire system inactive.

The twenty mile button 30 does not control any circuits, but may be used to return all of the subsequent buttons 31 to 38, inclusive, to inactive closed circuit position. Accordingly, when the contact 15 engages the contact 28, corresponding to a speed of twenty miles per hour, the circuit is completed for the signaling device 5.

Each of the stems of the push buttons 31 to 38, inclusive, includes insulation (such as indicated at 39) to maintain separate sets of circuits controlled by the buttons.

According to the present arrangement, when the speed reaches value beyond that for which the device is set (such as an additional five miles per hour), another signaling device 73 is energized. This signaling device may be an audible one, such as a buzzer, or the like. For this purpose, the other pair of each of the sets of contacts 21 to 26, and 29, are connected, respectively by conductors 74 to 81, inclusive, to spaced points along a series of circuit controllers similar to those already described. These circuit controllers include the contacts 82 and the corresponding contacting discs 83 that form a series circuit similar to the series circuit heretofore described. The lefthand end of the series is connected to the terminal conductor 74. The other end of the series is connected by way of conductor 84 to the relay 62' which is in series with the adjustable resistor 85 and the signaling device 73. When this supplemental signaling device is actuated, the relay 62' is energized and the front contacts 86 are established. This causes a change in the character of the signal produced by the signaling device 5. The signaling current, instead of passing through the resistor 60, now passes through a flasher mechanism 87, causing the signal lamp 5 to blink and thereby providing an additional warning signal. Resistor 60 is included so that the intensity of the light emitted by lamp 5 at the indicated speed will be somewhat less than at the speed five miles above this speed.

Each of the discs 83 of the upper series of circuit controllers is fixed to a corresponding disc in the first series of circuit controllers. Accordingly, when, for example, button 31 is actuated, there is a disc 83 which forms an open circuit in the series of circuit controllers. It is then not possible to energize the signaling device 73 until the circuit is completed through conductor 75. This conductor 75, however, is arranged to correspond to the thirty-mile position of the contact 15. Accordingly, when the push button 31, corresponding to a speed of twenty-five miles per hour, is actuated, an additional five miles per hour speed will cause the second signaling device 73 to be actuated.

An example of the manner in which the five mile increment is effective to energize the signal 73 may be explained, for example, in connection with the two conductors 62 and 75. Conductor 62 completes the circuit at a speed of twenty-five miles per hour. The conductor 75 proceeds to one of the set of contacts 21 which are contacted at thirty miles per hour. Any speed less than thirty miles per hour would not cause energization of signaling device 73 for the break at contacts 82 would prevent such energization. However, for any succeeding speed beyond thirty miles per hour, the series of circuit controllers would energize the signal circuit for the signaling device 73.

The contacts 27 and 48, corresponding to speeds of ninety miles per hour, and more, are rendered active when the contact 15 is moved sufficiently upwardly. The circuits for both signals 5 and 73 are energized when these speeds are reached. Signal 5 is energized through contact 48, conductor 88 and back contact 59. Signal 73 is likewise energized through contact 27, and conductor 84.

In the form just described, a five mile per hour increment serves to energize a second signaling device. In the form shown in Fig. 3, the supplemental signaling device 73 may be optionally actuated upon an increment of five miles per hour or ten miles per hour. Selection of this increment is effected by the aid of push button devices 89 and 90 which, respectively, carry contact discs 91' and 92. Contact disc 91' controls the contacts 93 and the disc 92 controls the contacts 94. By appropriate interlocking mechanism, only one of the two buttons 89 and 90 can be active at one time.

As before, there are a series of contacts which are connected in succession by upward movement of the contact member 15. Triple contacts are provided side by side for simultaneous contact with the member 15. These triple contacts 91 to 100, inclusive, are shown as corresponding to speeds of thirty to seventy-five miles per hour. Another set of contacts 101 corresponds to speeds of eighty miles per hour, and above.

As before, the contact member 15 is wide enough to maintain engagement with a set of contacts at all times.

A pair of contacts 102, below the triple contacts 91 is arranged to be engaged when the speed is thirty miles per hour; the single contact 103, corresponding to the lowest speed of twenty miles per hour, is connected by way of a conductor 104 to the left-hand terminal of a series of push button operated circuit controllers 105 to 114, inclusive. These operate as before to energize, by way of a conductor 115, the signaling device 116, such as a lamp.

When the twenty mile per hour button 117 is actuated, all of the other buttons 118 to 127, inclusive, are placed in the inactive closed position. Accordingly, at twenty miles per hour, there is a complete series circuit through the push button controlled circuit controllers 105, etc., to the signaling device 116.

When the speed reaches twenty-five miles per hour, a conductor 128 is engaged by the contact member 15. Accordingly, in the event that a twenty-five mile per hour button 118 is actuated, the light 116 will be energized, but not for any speeds below twenty-five miles per hour.

Conductors 129 to 137, inclusive, are connected respectively between adjacent pairs of the series of circuit controllers 106 to 114. The contact member 15 successively makes connections with these conductors as the speed increases, up to seventy miles per hour. Accordingly, if any one of the push buttons 117 to 127 is actuated, the speed must reach a value sufficient to make connection to that one of the conductors 128 to 137 which extends to the right of the open-circuited controller that corresponds to the active push button.

Conductor 137 has a branch 139 corresponding to seventy-five miles per hour position, and a branch 140 corresponding to a speed above seventy-five miles per hour. Accordingly, when any one of the sets of contacts 99, 100, or 101 is in cooperative relation to the movable contact 15, the light 116 is energized through a circuit independent of the push buttons. It is thus assured that for all speeds above seventy miles per hour the lamp 116 is lighted.

The twenty-mile button 117 does not actively enter into control of the circuits, and serves to ensure that all the other buttons 118 to 127 return to closed positions when button 117 is operated.

Another series of circuit controllers 141 to 150 is provided. These circuit controllers are arranged respectively to be operated by push buttons 118 to 127. When the "plus five" push button 89 is active, as illustrated, then an increase of five miles per hour in the speed at which light 116 is energized will cause energization of another signal, such as light 151. This is accomplished by the aid of a series of conductors 152 to 161, inclusive, and 188. Conductor 188 is the terminal conductor for the series; and the other conductors 152 to 161 connect between adjacent circuit controllers 141, etc. Conductor 152 forms the left-hand terminal and is connected to one of the contacts 102, corresponding to the speed of twenty-five miles per hour (the lowest at which the supplemental signal can be energized). These contacts 102 are one step above the contact that is connected to conductor 104. In other words, if push button 117 is energized, coresponding to a speed of twenty miles per hour, the contact 15 must engage contacts 102, corresponding to twenty-five miles per hour, before the series circuit for controlling lamp 151 is completed. Similarly, conductors 153 to 161 are connected to appropriate contacts 91 to 99 in the series of vertical contacts so as to cause the circuit for signaling devices 73 and 151 to be energized when the speed is five miles per hour greater than when lamp 116 is energized. The circuit for lamp 151 can be traced through ground 7, battery 6, "off" circuit controller 162, conductor 72, contact 15, through that one of the series of conductors 152 to 161, and 188, which is just to the right of the open circuit controller 141 to 150; thence through one or more of the closed circuit controllers 141 to 150, circuit controller 91'—93, connection 163, flasher 164, lamp 151, and ground 165. Paralleling the flasher and lamp circuit is the buzzer 73 which also sounds when this speed limit is exceeded.

Conductor 188, forming the right-hand terminal of the series of controllers 141 to 150, is connected to one of the contacts 100, corresponding to speeds of seventy-five miles per hour. Accordingly at this speed, when the "plus five" button 89 is active, the lamp 151 and buzzer 73 are energized. A branch 189 of this conductor is connected to one of the contacts 101, to cause these signal devices to operate at speeds above eighty miles per hour, provided button 89 is active.

When the "plus ten" button 90 is actuated, circuit controller 92—94 is completed and the circuit controller 91'—93 is open-circuited; now the supplemental signal devices 73 and 151 are energized only when the speed exceeds by at least ten miles per hour the speed at which signal 116 is energized.

Thus, the push button 90 serves to connect a series circuit including circuit controllers 166 to 175, inclusive, to conductor 163. These circuit controllers are operated respectively by push buttons 118 to 127, inclusive; each push button thus operates a tier of three circuit controllers through a common stem. These circuit controllers 166, etc., are arranged in series, the right-hand terminal being connected, as by conductor 176, to circuit controller 92—94. Furthermore, conductors 178 to 186 are connected respectively between adjacent circuit controllers 166, etc. The extreme left-hand conductor 177 is connected to the left of the circuit controller 166 and forms one terminal of the series of controllers. Similarly, conductor 187 forms the other terminal of the series.

These conductors 177 to 187 are connected to contacts in the series of contacts 91 to 101, and in such a way that connection is made through contacts 91 to 101 to the series circuit upon an increase of ten miles per hour in the speed at which lamp 116 is energized.

In order to explain the operation of this system, we take, for example, a condition in which the thirty-five miles per hour push button 120 is operated as indicated. The conductors 104, 128 and 129 obviously are ineffective to complete the signaling circuit for lamp 116, since these conductors are to the left of the open circuit controller 107. However, conductor 130 or any succeeding conductor to the right of controller 107 can cause energization of the circuit; but this can occur only when a speed of thirty-five miles per hour is attained, causing contact 15 to engage contacts 92.

At five miles beyond thirty-five miles per hour, that is, when contact 15 engages contacts 93, conductor 155 is rendered active to complete the circuit through the "plus five" circuit controller 91'—93 (if this is closed) to the lamp 151 and buzzer 73. Below forty miles per hour, when conductor 152, 153 or 154 is coupled to moving contact 15, these signal devices remain energized, for these conductors are to the left of the open circuit controller 143. Similarly, at a speed of forty-five miles per hour, or ten miles above that for which push button 120 is set, conductor 180 completes the "plus ten" circuit; and the supplemental signaling devices 73 and 151 may be energized through the "plus ten" circuit controller 92—94.

Above eighty miles per hour the lamp 116 is continually lighted by aid of the conductor 137 leading by way of conductor 140, to one of the contacts in the series of contacts 101. When the seventy miles per hour button 127 is actuated, attainment of seventy-five miles per hour, as well as the attainment of eighty miles per hour, will cause energization of the "plus five" circuit through conductors 188 and 189.

In the form shown in Fig. 4, there is a speed-responsive means 190, corresponding to the speed-responsive means 9 in the previous forms. A manually adjustable dial switch mechanism 194 is provided which may engage either the "off" button 195 or any one of a series of buttons 196 to 202, inclusive, corresponding respectively to a speed range of twenty to eighty miles per hour in ten mile increments. Buttons 196 to 202 are connected, respectively, to contact bars 203 to 209, inclusive. These bars are horizontally arranged, one above the other, and are insulated from each other.

Extending across these conducting bars and spaced above them are the parallel stationary contact members 210, 211 and 212.

Movable contact elements 191, 192 and 193 are interposed between the bars 203, etc., and the connecting bars 210, 211 and 212, so as to form contacting bridges from the bars 203 to 209, and members 210, 211, 212. Contact elements 191, 192 and 193 are joined to an insulation base 213, but are insulated from each other. Thus, all three elements are movable as a unit.

All of the contact members 191, 192, 193 are mounted on a common support 214 which is connected to the collar 215 of the speed-responsive device 190. Accordingly, the vertical position of the conductors 192 and 193 is dependent upon the speed of the vehicle.

An adjustable switch arm 216 cooperates with any one of the contact buttons 195 to 202; for example, it may rest upon contact button 200.

For this setting a speed of sixty miles per hour will cause a signaling device 217, such as a lamp, to be energized. This circuit can be traced from ground 218, automobile battery 219, arm 216, contact 200, bar 207, thence through conductor 191 to connector 210, back contact 220, fixed resistor 221, adjustable resistor 222, signaling device 217, and ground 223. This circuit is completed only when the conductor member 191 has reached a vertical position high enough to bridge the connection between bar 207 and connector 210. For positions below that speed the circuit is not completed.

Any particular bar 203 to 209 can be chosen to be connected to battery 219 by adjustment of the switch arm 216.

Conductor 192 is arranged to provide a supplemental signal when the preset speed is exceeded by five miles per hour. Similarly, conductor 193 is provided to energize a signal at "plus ten." The supplemental signal may be a buzzer 224. Choice of the energization of this signal at plus five or plus ten is effected by a selector switch 225.

The conductor 192 has an upper edge which is below the upper edge of conductor 191. The distance between these two edges corresponds to a five mile differential in speed. Accordingly, when, for example, the speed is sixty miles per hour or greater, the lamp 217 is energized. However, the speed must be sixty-five miles per hour before the upper edge of conductor 192 contacts bar 207. Then, when this occurs, the supplemental signal 224 is energized through bar 207, connector 211, switch 225, relay 226, and adjustable resistor 227. The relay 226 disconnects the back contacts 220 and causes the front contact 228 to be active. This substitutes the flasher 229 for the resistor 221.

Conductor 193 has its upper edge still lower than the upper edge of conductor 192, the vertical spacing between the top edge of conductor 191 and conductor 193 corresponding to a ten-mile differential. Accordingly, the speed must be exceeded by ten miles before the active bar 207 is connected to the connector 212. When this occurs, and when selector switch 225 places connector 212 into circuit, the buzzer 224 is energized.

Adjustment of the speed at which the lamp 217 is energized is simply effected by moving the contact arm 216 to an appropriate button. When this is done, the operator is apprised promptly upon the speed attaining the prescribed speed set by the arm 216. Further increment in speed of five or ten miles per hour causes the buzzer 224 to sound and the lamp 217 to flicker.

The inventor claims:

1. In an automobile speed signaling system: an electrically energizable signal device; a plurality of circuit controllers in series with said device; means for selecting any one of said controllers to interrupt the series circuit; a plurality of contacts connected respectively between said controllers; and speed responsive means selectively cooperating with said contacts for causing energization of the signal device when any contact beyond the open controller is selected by said speed responsive means.

2. In an automobile speed signaling system: a pair of electrically energizable signal devices; a first set of circuit controllers in series with one of said signal devices; a second set of circuit controllers in series with the other of said devices; the controllers of one set being respectively paired with the controllers of the other set; means for selecting any one of the pairs of sets to provide an interruption in the first set and simultaneously in the second set; a first set of contacts connected respectively between the first set of circuit controllers; a second set of contacts connected respectively between the second set of controllers; and speed responsive means selectively cooperating with said sets of contacts for causing energization of the signal devices when any contact beyond the open controller is selected by said speed responsive means; said second set of contacts being so arranged with respect to the first set that the second signal device is energized at a speed higher than that required to energize the first signal device.

3. In an automobile speed signaling system: a pair of electrically energizable signal devices; a first set of circuit controllers in series with one of said signal devices; a second set of circuit controllers in series with the other of said devices; the controllers of one set being respectively paired with the controllers of the other set; means for selecting any one of the pairs of sets to provide an interruption in the first set and simultaneously in the second set; a first set of contacts connected respectively between the first set of circuit controllers; a second set of contacts connected respectively between the second set of controllers; speed responsive means selectively cooperating with said sets of contacts for causing energization of the signal devices when any contact beyond the open controller is selected by said speed responsive means; said second set of contacts being so arranged with respect to the first set that the second signal device is energized at a speed higher than that required to energize the first signal device; and means in circuit with said second signal device for altering the signal of the first signaling device when the second signaling device is energized.

4. In an automobile speed signaling system: a pair of electrically energizable signal devices; a first circuit controller for one of said signal devices; speed responsive means for operating the controller to energize the first of said devices; said first circuit controller including means selecting the speed beyond which said signal device is energized; and a second circuit controller for the other of said signal devices; said second circuit controller having means for energizing the second signaling device beyond a speed which is greater than the speed at which the first signal device is energized.

5. In an automobile speed signaling system: a pair of electrically energizable signal devices; a first circuit controller for one of said signal devices; speed responsive means for operating the controller to energize the first of said devices; said first circuit controller including means selecting the speed beyond which said signal device is energized; a second circuit controller; a third circuit controller; means optionally placing either the second or third circuit controller in cooperative relation with respect to the second signal device; said second and third circuit controllers having means for energizing the second signaling device respectively at speeds greater than the speed at which the first signal device is energized.

6. In an automobile speed signaling system: a pair of electrically energizable signal devices; a first circuit controller for one of said signal devices; speed responsive means for operating the controller to energize the first of said devices; said first circuit controller including means selecting the speed beyond which said signal device is energized; a second circuit controller for the other of said signal devices; said second circuit controller having means for energizing the second signaling device beyond a speed which is greater than the speed at which the first signal device is energized; and means in circuit with said second signal device for altering the signal of the first signaling device when the second signaling device is energized.

7. In an automobile speed signaling system: an electrically energized signal device; a signaling circuit controlling said device and including a series of circuit controllers for determining and presetting the speed when the signal device may be energized; and speed responsive means for energizing the signal device when the speed exceeds that corresponding to the preset circuit controller and for maintaining said signal device energized for all speeds above said preset speed.

8. In an automobile speed signaling system: an electrically energized signal device; a signaling circuit controlling said device and including a series of circuit controllers for determining and presetting the speed when the signal device may be energized; a second signal device; a second signaling circuit controlling said device and including a second series of circuit controllers for determining and presetting the speed when said second device may be energized; setting means for pairs of circuit controllers respectively in the first and second circuits, for causing the second circuit to be preset at a higher speed than the first circuit; and speed responsive means for energizing the first signaling device when the speed exceeds that to which the first circuit is preset; said speed responsive means having means for energizing the second signaling device when the speed exceeds that to which the second circuit is preset.

9. In an automobile speed signaling system: means forming a series of contacts arranged in order of vehicle speeds; means preselecting one of the contacts in accordance with a limiting speed; a signaling circuit; said circuit including a conductor opposed to the series of contacts; a connector movable between said series of contacts and the conductor; and means responsive to the speed of the automobile for operating the connector, said signaling circuit having means maintaining said circuit energized for all positions of the connector beyond the speed corresponding to the preselected contact.

10. In an automobile speed signaling system: means forming a series of contacts arranged in order of vehicle speeds; means preselecting one of the contacts in accordance with a limiting speed; a pair of signaling circuits; each of said circuits including respectively a conductor opposed to the series of contacts; a pair of connectors simultaneously movable between said series of contacts and the conductors, the connectors thus separately controlling the signal circuits; and means responsive to the speed of the automobile for operating the connectors, one of the said connectors being in lagging relation to the other, for energizing its corresponding signal circuit at a speed in excess of the speed causing energization of the other signal circuit.

11. In an automobile speed signaling system: means forming a series of contacts arranged in order of vehicle speeds; means preselecting one of the contacts in accordance with a limiting speed; a pair of signaling circuits; one of said circuits including a conductor opposed to the series of contacts; the other circuit including a pair of conductors opposed to the series of contacts and means for optionally connecting either of the pairs into said other circuit; three connectors simultaneously movable respectively between each of the conductors and the series of contacts; one of the connectors thus separately controlling the first signal circuit, and the other two connectors separately controlling the other signal circuit; and means responsive to the speed of the automobile for operating the connectors, the other two connectors being in progressively lagging relation to the said one of the connectors, for energizing the corresponding signal circuit at speeds progressively in excess of the speed causing energization of the first signal circuit.

CHARLES STEIN.

REFERENCES CITED

The following references are of record in the file of this patent:

UNITED STATES PATENTS

| Number | Name | Date |
|---|---|---|
| 2,452,344 | Addorisio | Oct. 26, 1948 |